United States Patent [19]

Novak et al.

[11] Patent Number: 4,953,141
[45] Date of Patent: Aug. 28, 1990

[54] SONIC DISTANCE-MEASURING DEVICE

[75] Inventors: Joel S. Novak, Sudbury; Natan E. Parsons, Brookline, both of Mass.

[73] Assignee: Recurrent Solutions Limited Partnership, Cambridge, Mass.

[21] Appl. No.: 90,961

[22] Filed: Aug. 28, 1987

[51] Int. Cl.$^5$ .............................................. G01S 15/00
[52] U.S. Cl. ..................................... 367/108; 367/99
[58] Field of Search ................. 367/99, 108, 910, 103, 367/105, 900, 137

[56] References Cited

U.S. PATENT DOCUMENTS

| | | | |
|---|---|---|---|
| 3,465,337 | 9/1969 | Tanaka et al. | 367/103 |
| 3,916,373 | 10/1975 | Schroder | 367/137 |
| 4,267,584 | 5/1981 | McKeighen et al. | 367/103 |
| 4,398,420 | 8/1983 | Haesen et al. | 367/108 |
| 4,400,976 | 8/1983 | Blades | 367/99 |
| 4,439,846 | 3/1984 | Rodriguez | 367/108 |
| 4,464,738 | 8/1984 | Czajkowski | 367/900 |
| 4,574,368 | 3/1986 | Lipschutz | 367/108 |
| 4,717,862 | 1/1988 | Anderson | 367/13 |
| 4,731,762 | 3/1988 | Hanks | 367/108 |

OTHER PUBLICATIONS

Motorola Optoelectronic Device Data, 1983, pp. 442–443.
Circular: Sonic Tape.
Circular: "Mach 5", Distance-Meter.
Circular: Sonarange.
Circular: Keson "CalcuTape".
Circular: EMS FT4100.
Circular: Measure Mate.
Circular: Exact Distance-Measuring Computer.
Instruction Manual: Sonic Tape.
Instruction Manual: Echo-Tape.
Instruction Manual: Sonic Ranger Model SR-35A.

*Primary Examiner*—Thomas H. Tarcza
*Assistant Examiner*—Daniel T. Pihulic
*Attorney, Agent, or Firm*—Nutter, McClennen & Fish

[57] ABSTRACT

A sonic distance-measuring device (10) for use in air includes three transducers (14, 16, and 18) in an array of transducers, which are driven in a predetermined phase relationship so as to achieve a beam width that is substantially less than that which can be achieved by any of the transducers individually. To enable the user to aim the device (10) effectively, a lamp (20) is provided to shine along the sonic beam and thus help the user direct the beam at a desired target. To conserve energy and increase the ability to distinguish the light beam from ambient light, the lamp (20) is pulsed rather than driven steadily.

7 Claims, 2 Drawing Sheets

SONIC DISTANCE-MEASURING DEVICE

BACKGROUND OF THE INVENTION

The present invention is directed to sonic distance-measuring devices. It pertains particularly to sonic devices for measuring distances in air, such as the distances between walls in houses.

Numerous tapeless distance-measuring devices are presently available on the market. They greatly facilitate distance measurement, since one person can take a distance measurement with the press of a button while measurements with a conventional tape measure are more time-consuming and are difficult to take without a second person.

Although tapeless distance-measuring devices are relatively easy to use, presently available devices require some care in order to ensure that an accurate measurement is being made. They also tend to be expensive.

These two drawbacks are related. The user of a presently available tapeless measuring device typically aims the device, presses a button, and reads the measured distance on a device display. In many situations, however, it is best for the user to take several measurements, changing the orientation of the measuring device slightly between measurements. The reason for this is that the device may be detecting a target other than that at which the user believes he is aiming the device, and a significant change in the read-out between measurements will indicate to the user that he is measuring different targets. Without such care, the user can easily make a faulty measurement.

One of the reasons for the tendency to detect incorrect targets is that the sound transmitted by the sonic measurement device is of limited directionality. That is, there is a cone in space in which the device will detect objects, and this cone is often wide enough to include not only the desired target but also some false targets. To reduce this problem, the makers of such measuring devices employ large-diameter ultrasonic transducers. The larger the diameter of the transducer is for a given sound wavelength, the narrower the angle of the cone will tend to be. However, the large-diameter transducers are usually expensive because of the effort required to make the entire transducer face vibrate in phase. One way to obtain a narrower cone without using a large transducer is to provide a horn or other sonic "lens" to make a small transducer act as a large one. But such expedients tend to make the device bulky, and they, too, contribute significantly to the expense of the device.

SUMMARY OF THE INVENTION

The present invention increases the ease with which such devices can be employed and minimizes the cost required to manufacture these devices. According to one aspect of the invention, the sound-producing part of the measuring device comprises, not a single large-diameter transducer, but rather an array of smaller-diameter transducers. The individual transducers are simple to drive. But together they provide a narrow beam comparable to that of a larger transducer. Thus, a narrow beam can be achieved at a significantly lower cost.

According to another aspect of the invention, the sonic measuring device further includes a light source for producing a light beam directed along the sonic beam so as to illuminate target objects within the sonic beam. As a result, the user obtains visual feedback in the aiming process. He is thus much less likely to measure the distance to an undesired target.

The light source preferably flashes. Its flashing helps the user distinguish between the device-produced light and ambient light. Moreover, flashing the light source reduces power consumption.

BRIEF DESCRIPTION OF THE DRAWINGS

These and further features and advantages of the present invention are described in connection with the accompanying drawings, in which.

DETAILED DESCRIPTION OF ILLUSTRATIVE EMBODIMENTS

Figure 1:
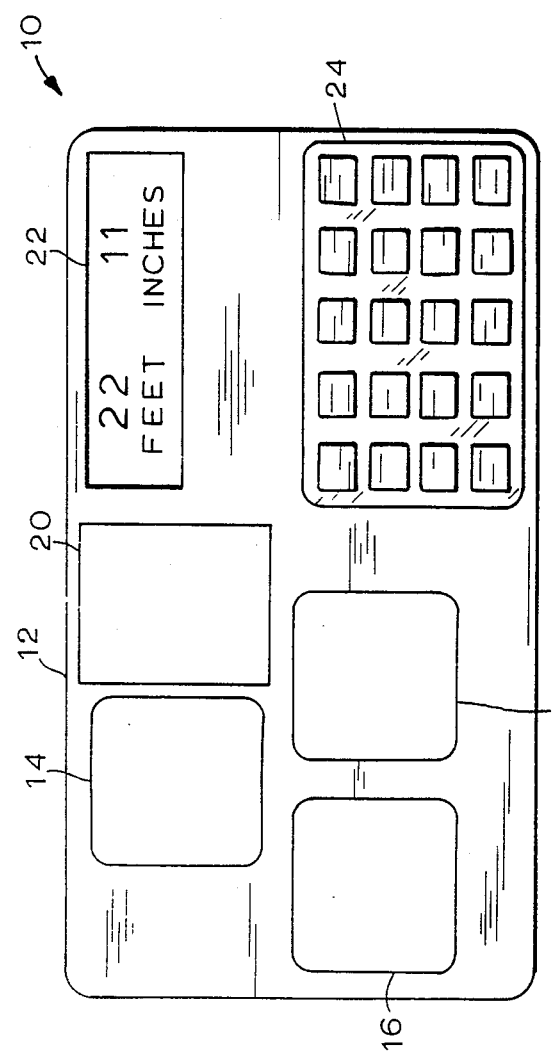
FIG. 1 is a front elevation of the sonic measuring device of the present invention.

FIG. 1 depicts a sonic measuring device 10. The device 10 includes a housing 12 on which are mounted three ultrasonic transducers 14, 16, and 18 of the capacitive diaphragm type. Although the transducers are of a moderate size, none is so large as to make it difficult to drive the entire transducer surface in phase. But an individual transducer of moderate size produces a sonic beam having a relatively wide angle. A wide-angle beam would make it difficult to prevent the device from responding to undesired targets in crowded areas.

According to the present invention, however, all three of the transducers are driven in phase so that they interfere—and thus prevent the propagation of significant sound power—outside of a relatively narrow beam. Similarly, the transducers respond to echoes reflected by targets in the beam, and the resulting electrical signals are added in phase so that echoes from targets outside of a relatively narrow beam tend to cancel, while those inside the beam reinforce each other. Consequently, the device is more directional with the three transducers than it would be with any one of them alone.

In addition to the transducers 14, 16, and 18, the housing 12 also has mounted in it a light source 20, which transmits a narrow beam of light that largely coincides with the ultrasound beam. The light beam enables the user to aim the device effectively and thus reduce the likelihood of erroneous measurements.

As is conventional in devices of this type, the measurement unit 10 measures the time between transmission of an ultrasound pulse and detection of the resulting echoes. It converts the time measurement to a distance measurement and presents the result on a display 22. The measurement unit additionally includes a keyboard 24 from which the user initiates measurements and operates a calculator that can conveniently be provided within the unit so as to enable the user readily to make unit and scale conversions and computations of area, volume, and so forth.

In operation, the transducers 14, 16, and 18 are repetitively driven with pulses of a 50 kHz carrier. A generally conical beam of sound propagates perpendicularly to the plane of the transducers. Targets in the path of the beam produce echoes to which the transducers 14, 16, and 18 respond by producing electrical sense signals. A microprocessor in the measurement unit 10 converts to a distance the time between pulse transmission and echo reception. It displays the distance measurement on the display 22.

Figure 2:
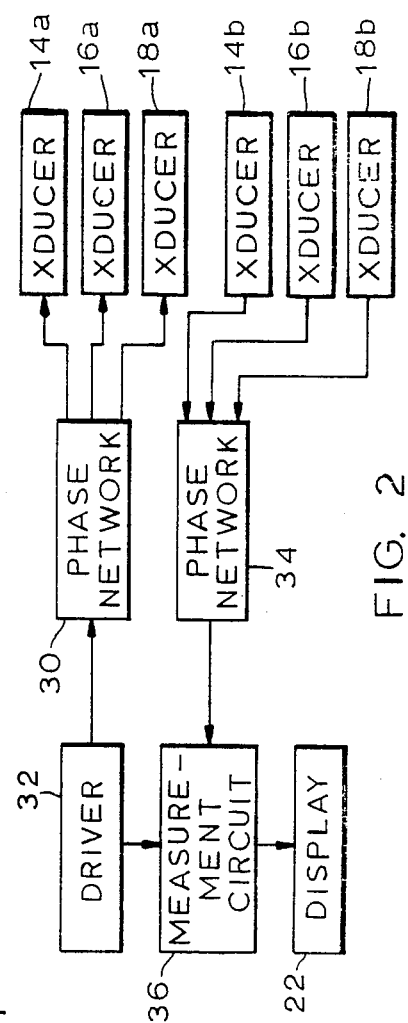
FIG. 2 is a block diagram of the circuitry employed in the measuring device.

FIG. 2 shows in diagramatic form the circuitry for performing these functions. The transducers 14, 16, and 18 are connected to a phase network 30. Driver circuitry for generating pulses of the intended ultrasound frequency apply such pulses to the phase network 30, which distributes them to the transducers 14, 16, and 18 at proper relative phases. In the illustrated embodiment, the phase network is extremely simple; all of the transducers are connected in parallel so that they are driven in phase. In general, however, the phase network could be more elaborate, enabling the driver to drive the transducers 14, 16, and 18 at relative phases with respect to each other so as to steer the resultant beam.

FIG. 2 also shows a second phase network 34, which receives the electrical sense signals produced by the transducers 14, 16, and 18 in response to received echoes. It combines these signals in a predetermined relative phase to produce a composite sense signal, which it applies to measurement circuitry 36. The second phase network 34 is depicted separately for conceptual purposes. As will shortly be illustrated, networks 30 and 34 in the illustrated embodiment are realized in the same circuitry. Measurement circuitry 36 measures the time between the transmission of a pulse and the reception of an echo of a predetermined amplitude, and it operates the display 22 accordingly.

Figure 3:
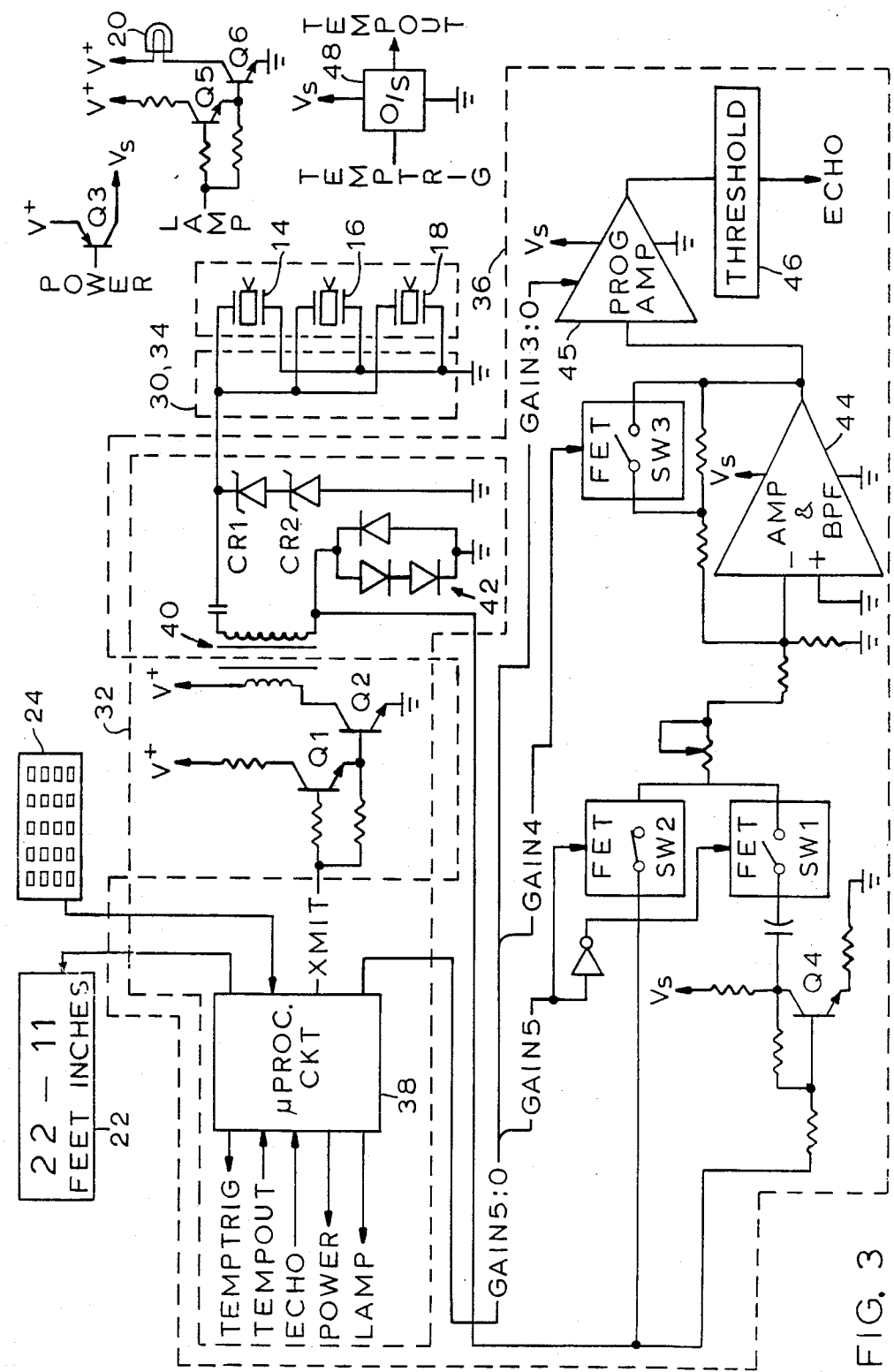
FIG. 3 is a more-detailed schematic diagram of the circuitry depicted in FIG. 3.

FIG. 3 depicts in more detail the circuitry shown in block-diagram form in FIG. 2. FIG. 3 depicts a microprocessor circuit 38, which includes a microprocessor and the customary read-only memory, random-access memory, and input/output circuits normally employed with a microprocessor. The microprocessor 38 is part both of the driver circuitry 32 and of the measurement circuit 36 of FIG. 2. FIG. 3 shows the three transducers 14, 16, and 18 connected in parallel. The phase networks 30 and 34 simply constitute the same set of connections, by which the transducers 14, 16, and 18 are connected in parallel.

The microprocessor circuitry 38 operates in accordance with a program stored in an included read-only memory. The program causes the microprocessor to transmit an XMIT signal to an amplifier that includes transistors Q1 and Q2. To cause the transducers to transmit, the microprocessor switches the XMIT signal between low and high levels at such a rate as to cause a square wave having a 20.2-microsecond period. For one burst of ultrasound, the microprocessor produces sixteen periods of the square wave, which transistors Q1 and Q2 amplify and apply to a transformer 40. Transformer 40 is a step-up transformer. Its secondary is connected to ground through a limiter circuit 42. Limiter circuit 42 presents a high impedance to voltages within a range of approximately −0.7 volt to +1.4 volts. It presents a very low incremental impedance to higher voltages. The step-up transformer steps the pulses to approximately 400 volts peak to peak. A pair of 200-volt zener diodes CR 1 and CR 2 prevent higher excursions.

Specifically, when the signal begins at transformer 40, the signal appearing at the transformer secondary charges a capacitor C1 through the unidirectional conduction of the zener diodes CR 1 and CR 2 so that the AC signal at the transformer is stepped up to the zero-to-400 volt range that appears across diodes CR 1 and CR 2. The secondary of transformer 40, together with transducers 14, 16, and 18, constitute a circuit tuned to 50 kilohertz, which is approximately the frequency of the XMIT pulses. Accordingly, the transducers transmit 320-microsecond pulses of 50-kilohertz ultrasound. Each pulse ends when the microprocessor terminates the XMIT signal, and switches a POWER signal from a high level to a low level, at which the power signal turns on a pnp transistor Q3 whose output $V_s$ powers a preamplifier Q4, a switched-feedback amplifier 44, a variable-gain tuned amplifier 45, and a threshhold circuit 46.

When the transducers 14, 16, and 18 receive an echo, they produce individual sense signals, which are effectively added together by the parallel wiring of the three transducers. The AC component of the resultant signal is transmitted through capacitor C1 and the secondary of transformer 40 to the base circuit of transistor Q4. Because the AC component of the sense signal received from the transducers is very low in voltage, typically less than a volt, the limiter circuit 42 does not appreciably affect it, and it is accordingly forwarded to amplifier 44.

Six of the output lines of the microprocessor circuit 38 are the GAIN 5:0 LINES, which together control the gain with which the sense signal is amplified. If an echo is received immediately after the ultrasound pulse is sent, it was produced by a very close target. The strength of the echo should therefore be very high. As time elapses from the transmitted pulse, the expected strength declines exponentially, and the change in the expected echo strength through the effective range of the measuring unit 10 exceeds 60 db. In contrast, the first sidelobe of the array pattern is only between 12 and 24 db down from the central maximum, so gain has to vary with time.

To accomplish this, the microprocessor 38 changes the total gain between the transducers 14, 16, and 18 and the input port of threshhold circuit 46. It switches among twenty-five levels of gain to span a gain range of approximately 62 db in 90 milliseconds. Part of the gain variation is obtained from the programmable-gain amplifier 45. Its gain is set by digital signals on four gain lines GAIN 3:0. Further variation is obtained from switches SW 1 and SW 2. The state of these switches is set by GAIN 5.

In one state of GAIN 5, switch SW 2 is closed and switch SW 1 is open, as the drawing illustrates. In this state, the amplifier that includes transistor Q4 has no effect, and the gain of that section of the circuit is essentially unity. In the other state, switch SW 2 is open and switch SW 1 is closed, so the Q4 amplifier is operative and provides an increment of gain.

GAIN 5 determines the state of SW 3, which controls another increment of gain. Switch SW 3 switches between two resistances in the feedback circuit of amplifier 44, thereby switching its gain.

As time elapses from the transmission of an ultrasound pulse, the signals on GAIN 5:0 change twenty-four times at various preset intervals to achieve the desired variation of gain with respect to time. The resultant amplifier signals are applied to the threshold circuit 46, which produces an ECHO SIGNAL at one of two values in accordance with whether its input is above or below a predetermined threshold. The microprocessor 38 then measures the time between the pulse transmission and the receipt of each subsequent ECHO pulse and determines from this measurement the distance of the detected target.

One could arrange the gain function so that it parallels the air attenuation curve. That is, if the air attenuation for a given distance is x db and the gain for that distance is x+a db, then the gain for a distance whose attenuation in air is y would be y+a. However, we have found empirically that it is better for gain to increase with distance somewhat more than attenuation does. Moreover, we provide the user the ability to choose between standard and long-range gain curves. The latter curve provides for a greater gain throughout the distance range, until the gain reaches the amplifier's maximum. In effect, the long-range curve decreases the directionality of the device slightly, and this has proved to be desirable for distances greater than about twenty feet in situations in which there are no undesired targets at shorter distances. In such situations, the user operates the keyboard 24 to indicate to the microprocessor circuit 38 that he chooses the long-range setting. In other situations, the user chooses the standard curve.

The translation from a time interval to a distance measurement is not a simple multiplication by a fixed proportionality constant. The speed of sound in air is significantly dependent upon ambient temperature, and the accuracy of the unit 10 could be unacceptable if a fixed proportionality constant were employed. Accordingly, the microprocessor circuit 38 includes a table of different conversion factors for different temperatures.

To determine the ambient temperature, the microprocessor circuit 38 transmits a TEMPTRIG signal to a one-shot 48 whose RC circuit employs a thermistor as the resistance. The duration of the one-shot output pulse TEMPOUT is therefore dependent on temperature. The conversion-factor table is keyed to TEMPOUT duration, and the microprocessor converts time to distance by employing the conversion factor dictated by the TEMPOUT duration.

In addition to making adjustments for temperature, the microprocessor circuit 38 performs further operations to enable it to ignore likely sources of noise. Specifically, the microprocessor circuit 38 does not simply apply to the display 22 signals that represent the distance corresponding to the time of occurrence of the first echo after any pulse. Instead, the microprocessor 38 stores the time of occurrence of the first several ECHO pulses following each transmitted pulse, and it compares the times of echoes for three successive transmissions. If the first ECHO pulse occurs at a given time in one cycle but no corresponding pulse occurs at the same time in the other two cycles, then that ECHO pulse will be ignored as noise. The microprocessor 38 will not display the corresponding distance on the display 22. The microprocessor 38 similarly discards all ECHO pulses that do not have corresponding pulses in other cycles. It displays a distance corresponding to the time of occurrence of the first ECHO pulse that occurs at the same time in three successive cycles.

This type of comparison eliminates the results of many sources of noise, but the results of one particular noise source would not be affected by this method without a further step. That source of noise is the switching noise caused by switches SW 1, SW 2, SW 3, and corresponding switches in the programmable gain amplifier 45. If this switching were to occur at the same time in each cycle, noise resulting from such switching could well occur at the same time in successive cycles. To avoid this, the microprocessor circuit 38 varies the times at which it changes the values of the signals on lines GAIN 5:0.

Specifically, the microprocessor circuit 38 determines at the end of every 2.74 milliseconds whether to make a change in the value of GAIN 5:0. This determination is made in accordance with a predetermined sequence that results in twenty-four changes—and thus twenty-five levels—mentioned above. The sequence of changes remains the same from cycle to cycle, with one exception: the time at which each 2.74-millisecond interval begins changes by 200 microseconds between the first cycle and the second cycle and by 200 more microseconds between the second cycle and the third cycle, and it then returns to the original starting time for the fourth cycle. This sequence continues so that the switching occurs at different times in every cycle in each sequence of three cycles. In this manner, switching noise does not occur at the same time in successive cycles.

If microprocessor 38 finds no ECHO pulses that occur at corresponding times in each of three successive cycles, it indicates to the user that it has failed to make a proper measurement. Although such an indication can be provided on the display 22, it is considered desirable also to provide audible feedback. Currently available measuring devices provide such audible feedback, but they have done so with sound-producing devices separate from the ultrasonic transducer. The reason for this is that the ultrasonic transducers are typically provided as part of circuitry highly tuned to the operative ultrasonic frequency, which is far beyond the range of human hearing. Thus, they find it necessary to employ separate noise-producing transducers tuned to an audible frequency.

In contrast, we produce the audible signal with the transducers 14, 16, and 18. We achieve this result by applying eight-pulse bursts of 50-kilohertz signal at 3-kilohertz rates. The transducers 14, 16, and 18 can be thought of as capacitors and the diaphragm of a transducer is one of the corresponding capacitor's plates which changes in position in response to changes in voltage. When the transformer 40 applies its signal to the transducers 14, 16, and 18, it causes them to maintain a DC voltage in addition to the AC voltage that produces the ultrasound. When the signal from the transformer 40 is removed, this DC voltage slowly discharges. It is this charging and discharging at a 3-kilohertz rate that causes the audible sound that the unit provides as audible feedback to the user. If a measurement has been successful, the microprocessor circuit 38 causes the transducers 14, 16, and 18 to produce a single 3-kilohertz beep. A failed measurement results in a two-beep signal.

As was indicated before, the unit further includes a lamp 20. The microprocessor circuit 38 is arranged to control the lamp 20. Since the lamp 20 requires relatively high power to produce bright light, it is a significant battery drain. In order to reduce the drain on the battery, the microprocessor circuit 38 operates the lamp 20 in such a way as to cause it to flash rather than burn steadily. This not only conserves energy but also makes the light from the lamp 20 easier to distinguish from ambient light.

As a further energy-conservation measure, the microprocessor circuit 38 operates the lamp 20 in such a way as partly to avoid the high current draw that tends to result when an incandescent lamp is repeatedly turned on and off. The microprocessor drives the lamp with a lower r.m.s. voltage during the early part of a lamp flash, when the incandescent-bulb filament is cool and thus has a relatively low impedance. After the filament warms and has thus increased its impedance, the microprocessor circuit 38 increases the r.m.s. voltage that it applies to the lamp 20.

Specifically, the microprocessor circuit 38 begins an on period of the lamp 20 by pulsing a LAMP signal with a 3-kilohertz square wave for 40 milliseconds. This turns transistors Q5 and Q6 on and off at that rate. Although essentially the entire voltage of the positive source appears across the lamp 20 when transistors Q5 and Q6 are on, the r.m.s., or effective, voltage is only seven tenths of the total source voltage, and the lamp 20 thus consumes only half as much power as it would if the transistors Q5 and Q6 were on steadily. This 3-kilohertz signal continues for 40 milliseconds, after which transistors Q5 and Q6 remain on steadily for 60 milliseconds. They are turned off for 400 milliseconds before beginning the sequence over again. In this way, the effect of high initial turn-on currents is reduced, but the energy-conservation benefits of reducing the duty cycle are still obtained.

Moreover, by flashing the lamp in this way, we can obtain a greater brightness for a given lamp without damage, than would be possible by steadily driving it or pulsing it in a conventional manner. In one embodiment, we have supplied a 5.2-volt peak potential to a bulb whose rated voltage is 2.2 volts, thus obtaining a considerably brighter beam than the bulb would ordinarily produce, without damaging the bulb.

It is apparent from the foregoing description that many of the aspects of the present invention can be practiced in a wide variety of embodiments. In particular, it is not necessary that the transducers 14, 16, and 18 be of the capacitive diaphragm type. They could be piezoelectric transducers or transducers of some other type. Furthermore, the number of transducers in the array is not restricted to three transducers, and the transducers do not have to be driven in phase. Thus, the present invention can be realized in a wide variety of embodiments and thus constitutes a significant advance in the art.

What is claimed as new and desired to be secured by Letters Patent of the United States is:

1. A sonic distance measuring device comprising:
   sonic transducer means including at least two individual sonic transducers for transmitting sound upon application of an electrical drive signal thereto and for producing electrical sense signals upon application of sound waves thereto;
   driver means for repetitively driving said transducers with pulses of oscillatory electrical signals so as to cause the transducers to transmit sound pulses repetitively;
   receiver means for receiving the electrical signals produced by said transducers and amplifying the signals with a gain that changes in steps as a function of time and amplifying the received signals; and
   timing-and-conversion measurement means for repetitively measuring the times between the transmissions of sound pulses by said transducer means and the times at which the subsequent amplified signals reach a predetermined threshold value, and for producing an indication of the distance required for sound to travel in a measured time, only if the measured time is substantially the same in different cycles, whereby noise caused by the gain steps is ignored.

2. For producing audible sound, a sound-generation apparatus comprising:
   a capacitive-type sonic transducer, adapted for application of a drive signal thereto and comprising a movable diaphragm, for moving the diaphragm in response to a changing drive signal;
   resonance circuitry, connected to the transducer, for applying to the transducer, in response to an oscillatory signal applied thereto, a single-polarity drive signal that includes a d.c. component and an a.c. component whose frequency is that of the oscillatory signal and for permitting the d.c. component of the drive signal to discharge from the capacitive transducer in the absence of the oscillatory signal, the resonance circuitry forming with the transducer a resonant circuit having a natural frequency in the ultrasonic range so that the amplitude of the drive signal applied to the transducer by the resonance circuitry is higher for a given amplitude of the oscillatory signal when the frequency of the oscillatory signal is in the ultrasonic range near the natural frequency than the amplitude of the drive signal is when the oscillatory signal is in the audible range; and
   a drive circuit for applying to the resonance circuitry, at an audible-frequency rate in at least one mode of operation, an oscillatory signal comprising pulses of oscillations whose frequency is near the natural frequency, whereby the d.c. component of the voltage on the capacitive transducer increases and decreases at an audible rate to cause the transducer to produce sound in the audible-frequency range.

3. A sonic distance measuring device including a sound-generation apparatus, said device comprising:
   a capacitive-type sonic transducer, adapted for application of a drive signal thereto and comprising a movable diaphragm, for moving the diaphragm in response to a changing drive signal and for producing electrical sense signals upon application of sound waves to the diagphragm;
   resonance circuitry, connected to the transducer, for applying to the transducer, in response to an oscillatory signal applied thereto, a single-polarity drive signal that includes a d.c. component and an a.c. component whose frequency is that of the oscillatory signal and for permitting the d.c. component of the drive signal to discharge from the capacitive transducer in the absence of the oscillatory signal, the resonance circuitry forming with the transducer a resonant circuit having a natural frequency in the ultrasonic range so that the amplitude of the drive signal applied to the transducer by the resonance circuitry is higher for a given amplitude of the oscillatory signal when the frequency of the oscillatory signal is in the ultrasonic range near the natural frequency than the amplitude of the drive signal is when the oscillatory signal is in the audible range;
   a drive circuit, operable in at least first and second modes of operation, for applying to the resonance circuitry an oscillatory signal comprising pulses of oscillations whose frequency is near the natural frequency, the pulses occurring at a pulse-repetition rate that is outside the audible range in the first mode of operation and in the audible range in the second mode of operation, whereby the d.c. component of the voltage on the capacitive transducer increases and decreases at an audible rate to cause the transducer to produce sound in the audible-frequency range; and measurement means for measuring the time between the transmission and reception of sound pulses by the transducer, for producing an indication of the distance required for sound to travel in a selected medium in the measured time, and for operating the drive circuit in the second mode of operation to provide an audible indication of whether the measurement was successful.

4. A sonic distance-measuring device comprising:
(A) sonic transducer means for transmitting sound upon application of an electrical drive signal thereto and for producing electrical sense signals upon application of sound waves thereto;
(B) driver means for repetitively driving the transducer with pulses of oscillatory electrical signal so as to cause the transducer to transmit sound pulses repetitively;
(C) receiver means for receiving the sense signals and amplifying the sense signals, with a gain that changes in steps as a function of time within cycles defined by successive pulses, to produce amplified receiver signals; and
(D) timing-and-conversion means for repetitively measuring the times between the transmissions of sound pulses by the transducer and the times at which the subsequent amplified receiver signals reach a predetermined threshold value and for producing an indication of the distance required for sound to travel in a measured time only if the measured time is substantially the same in different cycles.

5. A sonic distance-measuring device as defined in claim 4 wherein the times within cycles at which transitions between gain steps occur change from cycle to cycle.

6. A sonic measuring device comprising:
(A) sonic transducer means for transmitting sound upon application of an electrical drive signal thereto and for producing electrical sense signals upon application of sound waves thereto;
(B) driver means for repetitively driving the transducer with pulses of oscillatory electrical signal so as to cause the transducer to transmit sound pulses repetitively;
(C) receiver means for receiving the sense signals and amplifying the sense signals, with a gain that changes in gain steps as a function of time within cycles defined by successive pulses, to produce amplified receiver signals; and timing and conversion means for repetitively measuring the times between the transmissions of sound pulses by the transducer and the times at which the subsequent amplified signals reach a predetermined threshold value and for producing an indication of the distance required for sound to travel in a measured time only if the time in a given cycle at which the amplified signal reaches the predetermined threshold is different from the time of a transition between gain steps in the same cycle, whereby noise caused by the gain steps is ignored.

7. A sonic distance-measuring device as defined in claim 6 wherein the times within cycles at which transitions between gain steps occur change from cycle to cycle.

* * * * *